(12) United States Patent
Yoo et al.

(10) Patent No.: US 12,548,105 B2
(45) Date of Patent: Feb. 10, 2026

(54) SYSTEMS AND METHODS FOR MESSAGE EMBEDDING IN THREE-DIMENSIONAL IMAGE DATA

(71) Applicant: Google LLC, Mountain View, CA (US)

(72) Inventors: Innfarn Yoo, Fremont, CA (US); Xiyang Luo, San Mateo, CA (US); Feng Yang, Sunnyvale, CA (US); Ondrej Stava, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 230 days.

(21) Appl. No.: 18/008,285

(22) PCT Filed: Jun. 5, 2020

(86) PCT No.: PCT/US2020/036249
§ 371 (c)(1),
(2) Date: Dec. 5, 2022

(87) PCT Pub. No.: WO2021/247038
PCT Pub. Date: Dec. 9, 2021

(65) Prior Publication Data
US 2023/0214953 A1    Jul. 6, 2023

(51) Int. Cl.
*G06T 1/00* (2006.01)
*G09C 5/00* (2006.01)

(52) U.S. Cl.
CPC .............. *G06T 1/0028* (2013.01); *G09C 5/00* (2013.01); *G06T 2201/0065* (2013.01)

(58) Field of Classification Search
CPC .. G06T 1/0028; G06T 2201/0065; G09C 5/00
(Continued)

(56) References Cited

U.S. PATENT DOCUMENTS

2003/0095682 A1    5/2003  Joo et al.
2015/0277377 A1   10/2015  Tsang
2022/0019805 A1 *  1/2022  Zou ........................ G06F 18/214

FOREIGN PATENT DOCUMENTS

CN    108961392    12/2018
CN    109993678    7/2019
(Continued)

OTHER PUBLICATIONS

Machine Translation of KR 20080018521 to Jung et al. (Year: 2008).*
(Continued)

*Primary Examiner* — Aftab N. Khan
(74) *Attorney, Agent, or Firm* — DORITY & MANNING P.A.

(57) ABSTRACT

Systems and methods are directed to a computing system. The computing system can include one or more processors, a message embedding model, a message extraction model, and a first set of instructions that cause the computing system to perform operations including obtaining the three-dimensional image data and the message vector. The operations can include inputting three-dimensional image data and a message vector into the message embedding model to obtain encoded three-dimensional image data. The operations can include using the message extraction model to extract an embedded message from the encoded three-dimensional image data to obtain a reconstructed message vector. The operations can include evaluating a loss function for a difference between the reconstructed message vector and the message vector and modifying values for parameters of at least the message embedding model based on the loss function.

20 Claims, 8 Drawing Sheets

(58) Field of Classification Search
USPC .......................................................... 713/176
See application file for complete search history.

(56) References Cited

FOREIGN PATENT DOCUMENTS

| KR | 20080018521 A | * | 2/2008 | ........... G06T 1/0028 |
|----|---------------|---|--------|------------------------|
| WO | WO 2019185987 |   | 10/2019 |                       |

OTHER PUBLICATIONS

Cotting et al., Robust Watermarking of Point-Sampled Geometry, Proceedings of the Shape Modeling International 2004, IEEE Xplore (Year: 2004).*

International Preliminary Report on Patentability for Application No. PCT/US2020/036249, mailed Dec. 15, 2022, 8 pages.

Chinese Search Report Corresponding to Application No. 2020801027787 on Mar. 20, 2025.

Bors et al., "Optimized 3D Watermarking for Minimal Surface Distorion", IEEE Transactions on Image Processing, vol. 22, No. 5, 2012, pp. 1822-1835.

International Search Report for Application No. PCT/US2020/036249, mailed Feb. 24, 2021, 2 pages.

Jia et al., "Robust Invisible Hyperlinks in Physical Photographs Based on 3D Rendering Attacks", arXiv:1912.01224v1, dated Dec. 3, 2019, 10 pages.

Lin et al., "Rotation, Scale, and Translation Resilient Watermarking for Images", IEEE Transactions on image processing, vol. 10, No. 5, 2001, pp. 767-782.

Zhu et al., "HiDDeN: Hiding Data With Deep Networks", arXiv:1807.09937v1, dated Jul. 26, 2018, 22 pages.

Chinese Search Report Corresponding to Application No. 2020801027787 on Aug. 19, 2025.

* cited by examiner

SYSTEMS AND METHODS FOR MESSAGE EMBEDDING IN THREE-DIMENSIONAL IMAGE DATA

PRIORITY CLAIM

This application is based upon and claims the right of priority under 35 U.S.C. § 371 to International Application No. PCT/US2020/036249 filed on Jun. 5, 2020, which is incorporated by reference herein.

FIELD

The present disclosure relates generally to message embedding in three-dimensional image data. More particularly, the present disclosure relates to machine-learned model(s) for imperceptible or near-imperceptible hidden message embedding in three-dimensional image data.

BACKGROUND

Embedding messages in two-dimensional image data with conventional techniques has been a field of significant research. However, embedding imperceptible or near-imperceptible messages of sufficient length in three-dimensional image data poses unique challenges. As an example, messages embedded in three-dimensional image data generally must be extractable when rendered or rasterized from any viewpoint. As another example, message embedding techniques can often cause differences in three-dimensional image data that are significantly perceptible.

SUMMARY

Aspects and advantages of embodiments of the present disclosure will be set forth in part in the following description, or can be learned from the description, or can be learned through practice of the embodiments.

One example aspect of the present disclosure is directed to a computing system. A computing system can include one or more processors. A computing system can include a machine-learned message embedding model. The machine-learned message embedding model can be configured to receive three-dimensional image data and a message vector. The machine-learned message embedding model can be configured to generate, based on the three-dimensional image data and the message vector, encoded three-dimensional image data, the three-dimensional image data comprising an embedded message based on the message vector. The computing system can include a machine-learned message extraction model. The machine-learned message extraction model can be configured to receive the encoded three-dimensional image data. The machine-learned message extraction model can be configured to extract the embedded message from the encoded three-dimensional image data to obtain a reconstructed message vector. The computing system can include a first set of instructions that, when executed by the one or more processors, cause the computing system to perform operations. The operations can include obtaining the three-dimensional image data and the message vector. The operations can include inputting the three-dimensional image data and the message vector into the machine-learned message embedding model to obtain the encoded three-dimensional image data comprising the embedded message. The operations can include using the machine-learned message extraction model to extract the embedded message from the encoded three-dimensional image data to obtain the reconstructed message vector. The operations can include evaluating a loss function that evaluates a difference between the reconstructed message vector and the message vector. The operations can include modifying values for one or more parameters of at least the machine-learned message embedding model based on the loss function.

Another aspect of the present disclosure is directed to a computer-implemented method for watermark-based message embedding for three-dimensional image. The method can include obtaining three-dimensional image data and a message vector. The method can include inputting the three-dimensional image data and the message vector into a machine-learned message embedding model. The method can include receiving, from the machine-learned message embedding model, encoded three-dimensional image data comprising an embedded message based on the message vector. The method can include using a machine-learned message extraction model to extract the embedded message from the encoded three-dimensional image data to obtain a reconstructed message vector.

Another aspect of the present disclosure is directed to one or more tangible, non-transitory computer readable media. The one or more tangible, non-transitory computer readable media can store computer-readable instructions that when executed by one or more processors cause the one or more processors to perform operations. The operations can include obtaining three-dimensional image data and a message vector. The operations can include inputting the three-dimensional image data and the message vector into a machine-learned message embedding model. The operations can include receiving, from the machine-learned message embedding model, encoded three-dimensional image data comprising an embedded message based on the message vector. The operations can include using a machine-learned message extraction model to extract the embedded message from the encoded three-dimensional image data to obtain a reconstructed message vector.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
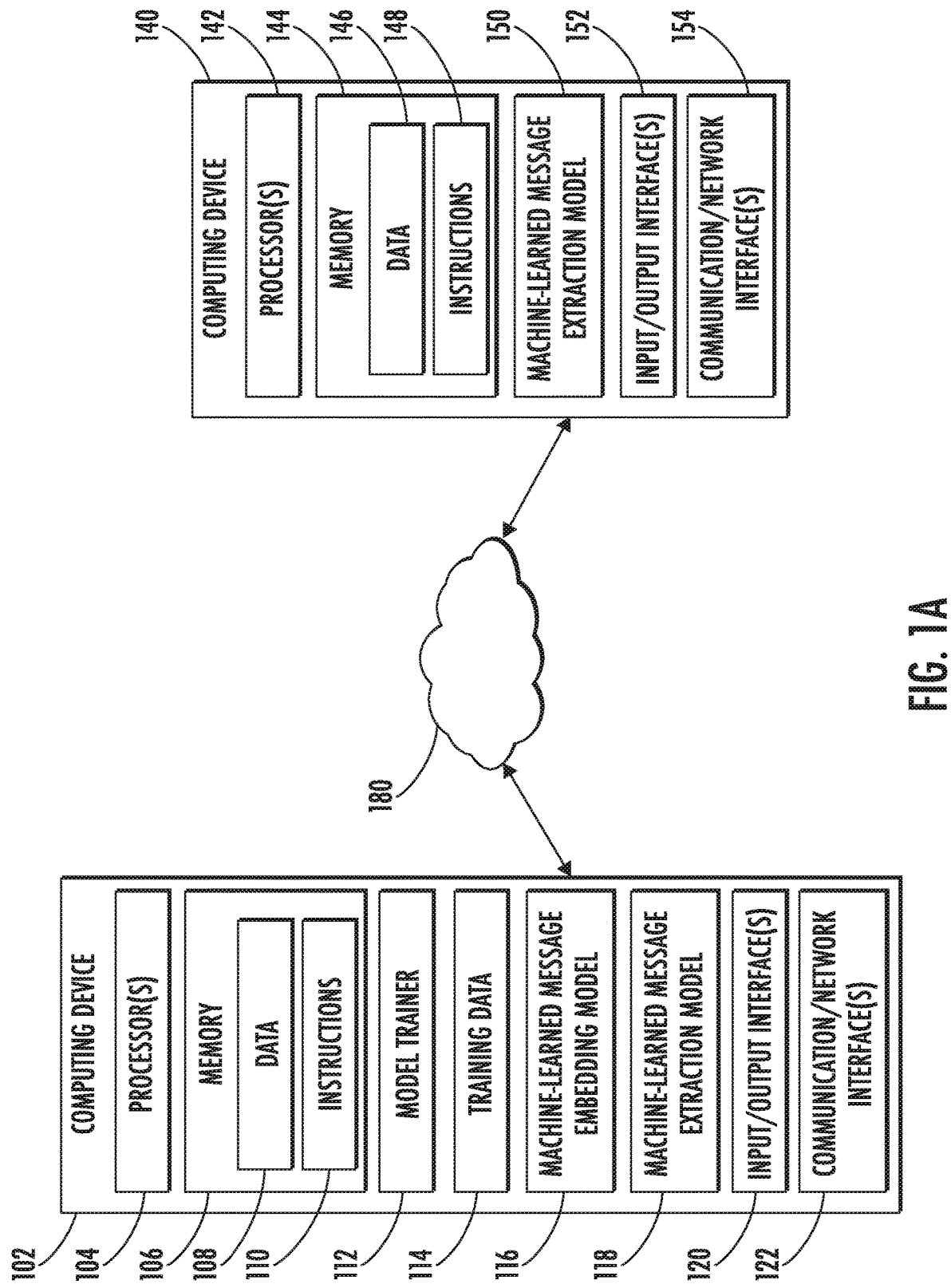
FIG. 1A depicts a block diagram of an example computing system that performs message embedding, message extraction, and/or training of machine-learned model(s) according to example embodiments of the present disclosure.

Reference numerals that are repeated across plural figures are intended to identify the same features in various implementations.

DETAILED DESCRIPTION

Overview

Generally, the present disclosure is directed to systems and methods for watermark message embedding in three-dimensional image data. More particularly, systems and methods described herein are directed to using a machine-learned message embedding model to embed a message into three-dimensional image data, where the machine-learned message embedding model has been trained to embed the message in the image data imperceptibly. The embedded message can later be extracted from the three-dimensional image data using a machine-learned message extraction model. Thus, as one example, a message vector can be obtained (e.g., with conventional message generation algorithms, as a latent space vector from a machine-learned model, etc.) and input to the machine-learned message embedding model alongside three-dimensional image data (e.g., a 3D mesh, 3D volumetric representation, point cloud, 3D mesh textures, 3D materials, etc.). The machine-learned message embedding model (e.g., a neural network, 3D convolutional neural network, graph convolutional neural network, etc.) can generate encoded three-dimensional image data that includes the message vector as an embedded message. The message vector can be embedded by modifying various aspects of the three-dimensional image data in a way that is imperceptible or minimally perceptible (e.g., modifying colors and/or positions of a mesh vertex, colors of a texture, labels of point cloud points, etc.). A difference (e.g., a perception difference, etc.) between the three-dimensional image data and the encoded three-dimensional image data can be used as a loss signal to train the machine-learned message embedding model. In such fashion, the machine-learned message embedding model can be trained to hide a message inside the three-dimensional image data in a manner that is imperceptible or near-imperceptible to a human observer. The proposed techniques represent a significant advancement in three-dimensional message embedding. In particular, by obtaining and embedding a message inside the three-dimensional message data without perceptibly modifying the three-dimensional image data, the proposed systems provide a method for both safely including and obfuscating proprietary data inside three-dimensional image data (e.g., identification information, decryption key(s), authentication information, location information, etc.).

More particularly, a computing system (e.g., one or more computing devices, a distributed network of computing devices, etc.) can obtain three-dimensional image data. The three-dimensional image data can be any sort of three-dimensional image, data, image data, three-dimensional volume, a three-dimensional representation, three-dimensional mapping data, point cloud data (e.g., from a LIDAR system, etc.), and/or any materials (e.g., textures, etc.) associated with the three-dimensional image data (e.g., textures associated with a three-dimensional mesh representation, etc.). As an example, the three-dimensional image data can be a 3D mesh (e.g., a polygonal mesh, etc.) and/or any materials associated with the 3D mesh (e.g., textures, 2D maps, transparency maps, color maps, roughness maps, bidirectional reflectance distribution function(s) (BRDFs), bidirectional scattering distribution function(s) (BSDFs), bidirectional scattering-surface reflectance distribution function(s) (BSSRDFs), etc.). As another example, the three-dimensional image data can be a point cloud (e.g., a plurality of points in a space, etc.), an encoded point cloud (e.g., a point cloud encoded according to an encoding scheme, etc.) and/or any labels associated with points in the point cloud.

The computing system can obtain a message vector. The message vector can be a portion of data that includes a message to be embedded in the three-dimensional image data. It should be noted that the message vector is not required to be a vector or vector-like data structure. Instead, a message vector can be any sort of data that includes a message. As an example, the message vector can represent the message as a vector of bits. As another example, the message vector can be a latent space vector (e.g., from an encoder model, etc.). As another example, the message can be a two-dimensional or three-dimensional array. As such, the machine-learned message embedding model can utilize any form and/or size of message vector for embedding in the three-dimensional image data.

The computing system can input the three-dimensional image data and the message vector into the machine-learned message embedding model. The machine-learned message embedding model can receive the three-dimensional image data and the message vector and generate encoded three-dimensional image data based on the three-dimensional image data and the message vector. The encoded three-dimensional image data can include an embedded message that is based on the message vector. The machine-learned message embedding model can be or can otherwise include one or more neural networks (e.g., deep neural networks) or the like. Neural networks (e.g., deep neural networks) can be feed-forward neural networks, convolutional neural networks, and/or various other types of neural networks. In some implementations, the machine-learned message embedding model can be or otherwise include a conditional variational autoencoder.

The embedded message can be embedded through modification of one or more aspects of the three-dimensional image data. As an example, if the three-dimensional image data is or otherwise includes a 3D mesh, the embedded message can be embedded by the machine-learned message embedding model by modifying aspect(s) of vertice(s) of the 3D mesh (e.g., a vertex position, a vertex color, materials of the 3D mesh, etc.). As another example, if the three-dimensional image data is or otherwise includes one or more 3D volumes, the embedded message can be embedded by the machine-learned message embedding model by modifying aspect(s) of the 3D volume(s) (e.g., volume value(s), voxel value(s), etc.). As yet another example, if the three-dimensional image data is or otherwise includes a material associated with a 3D representation, the embedded message can be embedded by the machine-learned message embedding model by modifying aspect(s) of material(s) of the 3D representation (e.g. BSSRDF(s), BSDF(s), BRDF(s), texture color values, height maps, transparency maps, texture color(s), etc.). As yet another example, if the three-dimensional image data is or otherwise includes a point cloud, the embedded message can be embedded by the machine-learned message embedding model by modifying aspect(s) of the point cloud (e.g., point position(s), point value(s), point label(s), etc.).

The embedded message based on the message vector can be any type or quantity of information. As an example, the embedded message may include a decryption key. The decryption key can correspond to an encrypted aspect of the three-dimensional image data and/or any other encrypted information. As another example, the embedded message may include private information. For another example, the embedded message in the point cloud of the previous example may further be encrypted (e.g., to protect patient privacy, etc.), and the hidden message may include a decryption key to decrypt the remainder of the embedded message and/or the 3D data itself. Example 3D data can include 3D models (e.g., mesh models), medical imaging data (e.g., Mill data), LIDAR point clouds, RADAR data, and/or other forms of 3D data.

As another example, the embedded message may include authentication information. The authentication information can be configured to authenticate a source for the three-dimensional image data. For example, the authentication information may be or otherwise include a cryptographic hash, code, and/or key associated with the creator and/or source of the three-dimensional image data. For another example, the authentication information may identify the three-dimensional image data as authentic (e.g., not pirated, stolen, reproduced, etc.). As yet another example, the embedded message may include location information. The location information may describe a transmitting location for the three-dimensional image data, a receiving location for the three-dimensional image data, or both. For example, the location data may include an IP address associated with a sender of the three-dimensional image data. For another example, the location information may include geolocational coordinates corresponding to the sender of the three-dimensional image data.

In some implementations, the encoded three-dimensional image data can be projected, rendered, or rasterized to a lower-dimensional representation of the encoded three-dimensional image data. The lower-dimensional projection of the encoded three-dimensional image data can correspond to a viewpoint (e.g., a camera position, viewpoint, etc.). As an example, if the encoded three-dimensional image data is or otherwise includes a point cloud, the points of the point cloud can be projected to a lower-dimensional space corresponding to a lower-dimensional viewpoint (e.g., a 2D projection, 2.5D projection with depth data, etc.). As another example, if the encoded three-dimensional image data can be rendered or rasterized to a lower dimension, (e.g., a 3D mesh, a 3D volume, etc.), the 3D mesh can be rendered or rasterized using a rendering scheme or rasterization scheme to a lower-dimensional space (e.g., a 2D frame of a video game for display on a display device, etc.).

In some implementations, the rendering scheme or rasterization scheme used to project the encoded three-dimensional image data can include one or more camera parameters. The camera parameter(s) can determine what is included in the lower-dimensional representation of the encoded three-dimensional image data. As an example, one or more implicit and/or one or more explicit camera parameters can be included to determine various aspects of the camera associated with rendering or rasterizing the encoded three-dimensional image data. As another example, camera location coordinates can be included that describe a location of the camera in a three-dimensional space. For example, the encoded three-dimensional image data can include a 3D polygonal mesh representation of a vehicle. The camera location coordinates can describe a location of the camera such that the camera is located in front of the car. The rendering scheme can render the encoded three-dimensional image data according to the camera parameter(s) such that a 2D representation of the encoded three-dimensional image data depicts the front of the car. Further, if the camera location coordinates describe a location of the camera behind the vehicle, the 2D representation can depict the rear of the car. Similarly, other camera parameter(s) (e.g., camera aspect ratio, camera angle, camera field of view, etc.) can be included to further specify what is captured in the lower-dimensional representation of the encoded three-dimensional image data.

In some implementations, the embedded message can be embedded in the encoded three-dimensional image data such that the embedded message can be extracted from any lower dimensional representation of the image data. As an example, to further use the previous example of a lower-dimensional representation of a car from a front side and a rear side, the embedded message could be extracted from the lower dimensional representation of the front side and/or the lower dimensional representation of the rear side. In such fashion, any projection, rendering, or rasterization of the encoded three-dimensional image data, based on any camera parameter(s), can include the embedded message for extraction (e.g., by a machine-learned message extraction model, etc.).

The computing system can receive the encoded three-dimensional image data that includes the embedded message from the machine-learned message embedding model. In some implementations, a first computing device of the computing system can receive the encoded three-dimensional image data from the machine-learned message embedding model and transmit the encoded three-dimensional image data to a second computing device of the computing system (e.g., via a network, etc.). Alternatively, in some implementations, the computing system can transmit the encoded three-dimensional image data to a second computing system distinct from the first computing system (e.g., via a network, etc.). In such fashion, the computing system can generate the encoded three-dimensional image data at a first location (e.g., a first computing device of the computing system, a first computing system, etc.) and transmit the encoded three-dimensional image data for decoding at a second location (e.g., a second computing device of the computing system, a second computing system, etc.), thereby facilitating transmission of the hidden (e.g., embedded) message to a receiving party.

The computing system can use a machine-learned message extraction model to extract the embedded message from the encoded three-dimensional image data to obtain a reconstructed message vector. The machine-learned message extraction model can be or can otherwise include one or more neural networks (e.g., deep neural networks) or the like. Neural networks (e.g., deep neural networks) can be feed-forward neural networks, convolutional neural networks, and/or various other types of neural networks. In some implementations, the machine-learned message extraction model and the machine-learned message embedding model can be or otherwise be components of an autoencoder architecture (e.g., autoencoder(s), variational autoencoder(s), etc.). As an example, the machine-learned message embedding model and/or the machine-learned message extraction model can be a conditional variational autoencoder. As another example, a combination of both the machine-learned message embedding model and the machine-learned message extraction model can be a conditional variational autoencoder.

The reconstructed message vector can be extracted from the encoded three-dimensional image data using the machine-learned message extraction model. More particularly, the machine-learned message extraction model can receive the encoded three-dimensional image data and the extract the embedded message from the encoded three-dimensional image data to obtain a reconstructed message vector. In some implementations, the reconstructed message vector can be a lossless reconstruction of the message vector (e.g., an identical or substantially similar instance of the message vector). Alternatively, in some implementations, the reconstructed message vector can be a lossy reconstruction of the message vector. The data loss associated with the reconstruction of the message vector can vary depending on a number of factors (e.g., the type of the three-dimensional image data, the size of the message, the type of the message, etc.).

In some implementations, the reconstructed message vector can be extracted from the lower-dimensional representation projected from the encoded three-dimensional image data. Extraction from a lower-dimensional representation of the encoded three-dimensional image data will be discussed in greater detail with regards to FIG. 5.

In some implementations, the machine-learned message extraction model can also output the encoded three-dimensional image data. As an example, the output of the machine-learned message extraction model can be the reconstructed message vector and the encoded three-dimensional image data (e.g., the three-dimensional image data including the embedded message). Alternatively, in some implementations, the machine-learned message extraction model can decode the encoded three-dimensional image data to output the three-dimensional image data (e.g., remove the modifications to aspects of the image data used to embed the embedded message).

The computing system can evaluate a loss function that evaluates a difference between the reconstructed message vector and the message vector. More particularly, the loss function can evaluate a reconstruction error (e.g., a degree of encoding/decoding loss) associated with the embedding and extraction of the message from the three-dimensional image data. Additionally, or alternatively, in some implementations, the loss function can further evaluate a difference between the three-dimensional image data and the encoded three-dimensional image data. More particularly, the loss function can evaluate the perceptual difference resulting from the modification of aspects of the three-dimensional image data to embed the message.

The computing system can modify values for one or more parameters of at least the machine-learned message embedding model based on the loss function. Additionally, in some implementations, the computing system can also modify values for one or more parameters of the machine-learned message extraction model. As an example, the loss function can be backpropagated through the machine-learned message embedding model and the message extraction model to determine values associated with one or more parameters of the models to be updated. The one or more parameters can be updated to reduce the difference evaluated by the loss function (e.g., using an optimization procedure, such as a gradient descent algorithm). Thus, in such fashion, evaluation of the loss function can, in some implementations, minimize a difference (e.g., a loss of data) from embedding and extracting the message from the three-dimensional image data while also minimizing a difference (e.g., a perceptual difference) resulting from embedding the message in the three-dimensional image data, therefore providing a highly accurate but imperceptible or near-imperceptible message embedding.

In some implementations, prior to using the machine-learned message extraction model to extract the embedded message, the computing system can distort the encoded three-dimensional image data with one or more distortion effects. More particularly, the computing system can apply one or more distortion effects to the encoded three-dimensional image data while training the model(s) to make the model(s) more robust to common distortion effects applied to three-dimensional image data during usage of the trained model(s). The distortion effect(s) can include image noise, image rotation, image simplification, image data refinement, image cropping, encoding loss (e.g., data loss associated with a lossy encoding scheme), or any other sort of distortion effect(s). The distortion of the encoded three-dimensional image data will be discussed in greater detail with regards to FIG. 4.

In some implementations, while training the model(s) (e.g., evaluating a loss function and modifying value(s) of parameter(s) of the model(s)), the computing system can utilize a differentiable projection, rendering, and/or rasterization scheme to project the encoded three-dimensional image data to a lower-dimensional representation. In such fashion, the differentiable projection, rendering, and/or rasterization scheme can allow for utilization of backpropagation and/or gradient descent algorithm(s) (e.g., stochastic gradient descent, etc.) to adjust value(s) for parameter(s) of the model(s).

It should be noted that any contemporary differentiable rendering scheme can be utilized during training to project the encoded three-dimensional image data to a lower dimensional representation. As an example, differentiable Monte Carlo ray tracing through edge sampling can be utilized as a differentiable rendering scheme (See Tzu-Mao Li et al., *Differentiable Monte Carlo Ray Tracing through Edge Sampling*, ACM Trans. Graph., (ACM), Vol. 37, No. 6, Article 222 (November 2018)). As another example, deep convolutional network(s) can be used as a differentiable rendering scheme (See Thu Nguyen-Phuoc, Chuan Li, Stephen Balaban, Yong-Liang Yang, *RenderNet: A deep convolutional network for differentiable rendering from 3D shapes*, $32^{nd}$ Conference on Neural Information Processing Systems, (NeurIPS 2018), pp. 7891-7901 (November 2018)). As yet another example, soft rasterization can be utilized as a differentiable rasterization scheme (See Shichen Liu, Weikai Chen, Tianye Li, Hao Li, *Soft Rasterizer: Differentiable Rendering for Unsupervised Single-View Mesh Reconstruction*, arXiv preprint, (arXiv), arXiv:1901.05567 (2019)). As yet another example, neural radiance fields can be utilized as a differentiable rendering scheme (See Ben Mildenhall, Pratul P. Srinivasan, Matthew Tancik, Jonathan T. Barron, Ravi Ramamoorthi, Ren Ng, *NeRF: Representing Scenes as Neural Radiance Fields for View Synthesis*, arXiv preprint, (arXiv), arXiv:2003.08934 (2020)). In such fashion, any contemporary, state-of-the-art, or future differentiable rendering and/or rasterization scheme can be utilized to provide differentiable rendering and/or rasterization in accordance with the present embodiments.

The present disclosure provides a number of technical effects and benefits. As one example technical effect and benefit, the systems and methods of the present disclosure enable the utilization of message embedding without significant perception loss in the three-dimensional image data, in turn allowing for seamless and efficient transfer of three-dimensional image data. As an example, authentication material (e.g., license data, etc.) can be included in the three-dimensional image data instead of requiring an additional transmission of data. Thus, by including the message in the three-dimensional image data, the systems and methods of the present disclosure can significantly reduce bandwidth and memory usage related to transmission of three-dimensional image data. As another example, the embedded message may include private information. Without the use of a corresponding machine-learned message extraction model the embedded message is difficult to extract from the three-dimensional image data, effectively encrypting the embedded message in the three-dimensional image data.

With reference now to the Figures, example embodiments of the present disclosure will be discussed in further detail.

Example Devices and Systems

FIG. 1A depicts a block diagram of an example computing system 100 that performs embedding and extraction of messages using machine-learned models that are trained according to example embodiments of the present disclosure. The system 100 includes a first computing device 102 and a second computing device 140 that are communicatively coupled over a network 180.

The first computing device 102 can be any type of computing device, such as, for example, a personal computing device (e.g., laptop or desktop), a mobile computing device (e.g., smartphone or tablet), a gaming console or controller, a wearable computing device, an embedded computing device, a personal assistant computing device, or any other type of computing device.

The first computing device 102 includes one or more processors 104 and a memory 106. The one or more processors 104 can be any suitable processing device (e.g., a processor core, a microprocessor, an ASIC, a FPGA, a controller, a microcontroller, etc.) and can be one processor or a plurality of processors that are operatively connected. The memory 106 can include one or more non-transitory computer-readable storage mediums, such as RAM, ROM, EEPROM, EPROM, flash memory devices, magnetic disks, etc., and combinations thereof. The memory 106 can store data 108 and instructions 110 which are executed by the processor 104 to cause the first computing device 102 to perform operations.

According to an aspect of the present disclosure, the first computing device 102 can store or include one or more machine-learned models. The machine-learned models can be or can otherwise include one or more neural networks (e.g., deep neural networks) or the like. Neural networks (e.g., deep neural networks) can be feed-forward neural networks, convolutional neural networks, and/or various other types of neural networks. In some implementations, the machine-learned models can be or otherwise include one or more conditional variational autoencoders.

More particularly, machine-learned models can be implemented to provide embedding and extraction of messages vector(s) within three-dimensional image data. As one example, the machine-learned models can include a machine-learned message embedding model 116 and a machine-learned message extraction model 118. In particular, the machine-learned message embedding model 116 can receive three-dimensional image data (e.g., 3D meshes, volumes, point clouds, etc.) and a message vector. The machine-learned message embedding model 116 can generate encoded three-dimensional message data that includes an embedded message based on the message vector. The machine-learned message extraction model 118 can obtain encoded three-dimensional image data as an input and extract the message vector from the encoded three-dimensional image data to obtain a reconstructed message vector.

The first computing device 102 can also include model trainer(s) 112. The model trainer 112 can use training data 114 to simultaneously train or re-train machine-learned models, such as the machine-learned message embedding model 116 and the machine-learned message extraction model 118, stored at the first computing device 102 using various training or learning techniques, such as, for example, backwards propagation of errors (e.g., truncated backpropagation through time). In particular, the model trainer 112 can use training data 114 to simultaneously train or re-train the machine-learned message embedding model 116 and machine-learned message extraction model 118. The specific training signal(s) used to train or retrain the machine-learned models will be discussed in-depth in the following figures. Training data 114 can additionally, in some implementations, include differentiable projection schemes (e.g., differentiable rendering schemes and/or differentiable rasterization schemes) to facilitate usage of backpropagation and gradient descent algorithm(s) during the training of the model(s).

The model trainer 112 can perform a number of generalization techniques (e.g., weight decays, dropouts, etc.) to improve the generalization capability of the models being trained. Thereafter, the machine-learned message embedding model 116 and machine-learned message extraction model 118 can be used immediately to embed and extract messages in images.

The first computing device 102 can also include one or more input/output interface(s) 122. One or more input/output interface(s) 122 can include, for example, devices for receiving information from or providing information to a user, such as a display device, touch screen, touch pad, mouse, data entry keys, an audio output device such as one or more speakers, a microphone, haptic feedback device, etc. An input/output interface(s) 122 can be used, for example, by a user to control operation of the first computing device 102.

The first computing device 102 can also include one or more communication/network interface(s) 124 used to communicate with one or more systems or devices, including systems or devices that are remotely located from the first computing device 102. The communication/network interface(s) 124 can include any circuits, components, software, etc. for communicating with one or more networks (e.g., network 180). In some implementations, the communication/network interface(s) 124 can include, for example, one or more of a communications controller, receiver, transceiver, transmitter, port, conductors, software, and/or hardware for communicating data.

The second computing device 140 includes one or more processors 142 and a memory 144. The one or more processors 142 can be any suitable processing device (e.g., a processor core, a microprocessor, an ASIC, a FPGA, a controller, a microcontroller, etc.) and can be one processor or a plurality of processors that are operatively connected. The memory 144 can include one or more non-transitory computer-readable storage mediums, such as RAM, ROM, EEPROM, EPROM, flash memory devices, magnetic disks, etc., and combinations thereof. The memory 144 can store data 146 and instructions 148 which are executed by the processor 142 to cause the second computing device 140 to perform operations.

As described above, the second computing device 140 can store or otherwise include one or more machine-learned models. The machine-learned models can be or can otherwise include one or more neural networks (e.g., deep neural networks) and the neural networks (e.g., deep neural networks) can be feed-forward neural networks, convolutional neural networks, and/or various other types of neural networks.

More particularly, the second computing device 140 can receive and store a trained machine-learned model, for example, from the first computing device 102 via the network 180. For example, the computing device 140 can receive the machine learned message extraction model 150 to extract embedded messages in encoded three-dimensional image data that is transmitted to computing device 140. The second computing device 140 can use the machine-learned model(s) for the same or similar purposes as described above.

As an example, encoded three-dimensional image data including an embedded message can be generated by the machine-learned message embedding model 116 and transmitted to the computing device 140 alongside and the machine-learned message extraction model 118 via network 180. The computing device 140 can use the transmitted machine-learned message extraction model 150 to extract the message from the transmitted encoded three-dimensional image data and generate a reconstructed message vector corresponding to a message vector at the first computing device 102.

The second computing device 140 can also include one or more input/output interface(s) 152. The one or more input/output interface(s) 152 can include, for example, devices for receiving information from or providing information to a user, such as a display device, touch screen, touch pad, mouse, data entry keys, an audio output device such as one or more speakers, a microphone, haptic feedback device, etc. An input/output interface(s) 152 can be used, for example, by a user to control operation of the second computing device 140.

The second computing device 140 can also include one or more communication/network interface(s) 154 used to communicate with one or more systems or devices, including systems or devices that are remotely located from the second computing device 140. The communication/network interface(s) 154 can include any circuits, components, software, etc. for communicating with one or more networks (e.g., network 180). In some implementations, the communication/network interface(s) 154 can include, for example, one or more of a communications controller, receiver, transceiver, transmitter, port, conductors, software, and/or hardware for communicating data.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well.

Figure 1B:
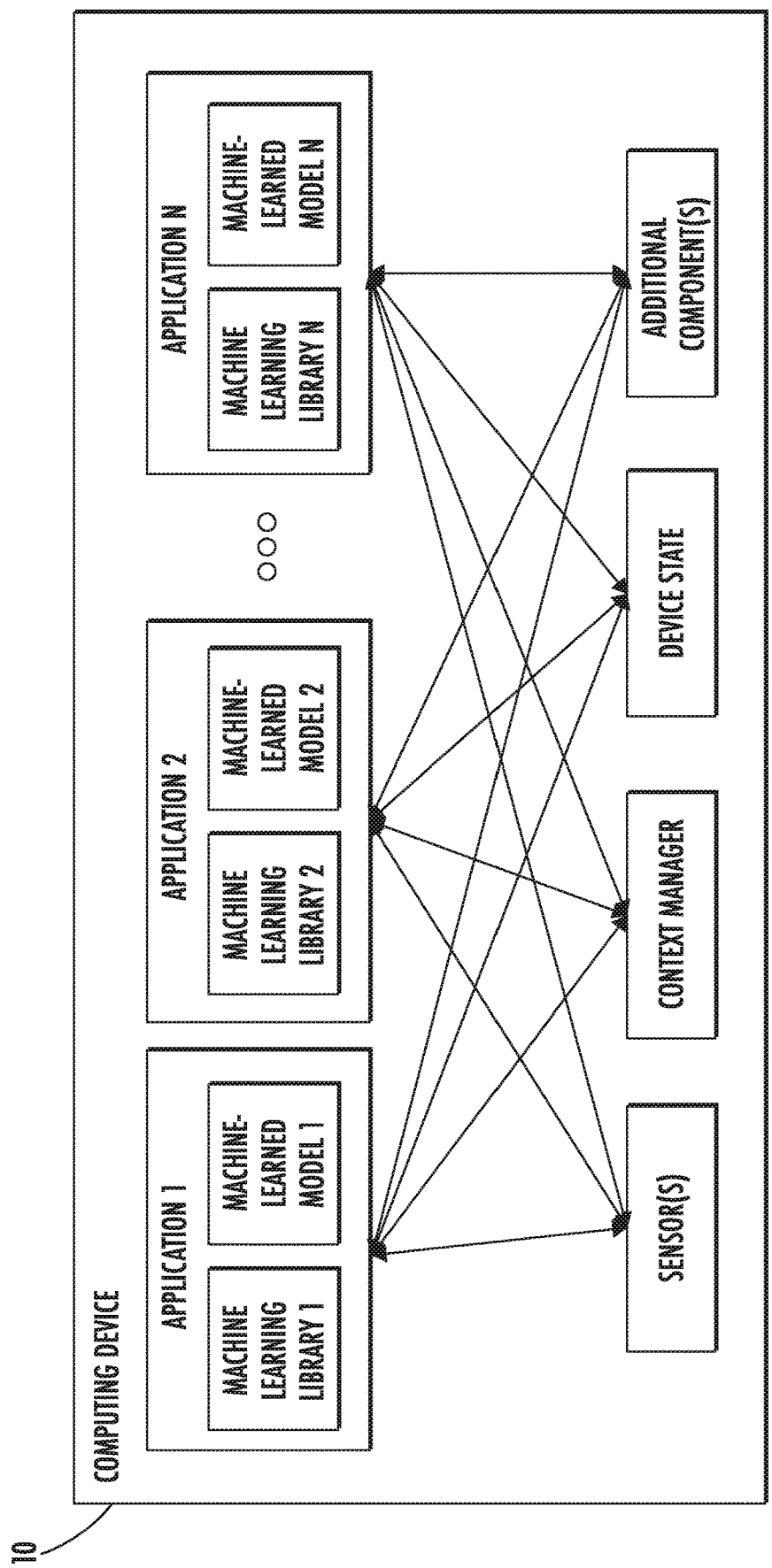
FIG. 1B depicts a block diagram of an example computing device that performs message embedding and/or extraction according to example embodiments of the present disclosure.

FIG. 1B depicts a block diagram of an example computing device 10 that performs message embedding and/or extraction according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
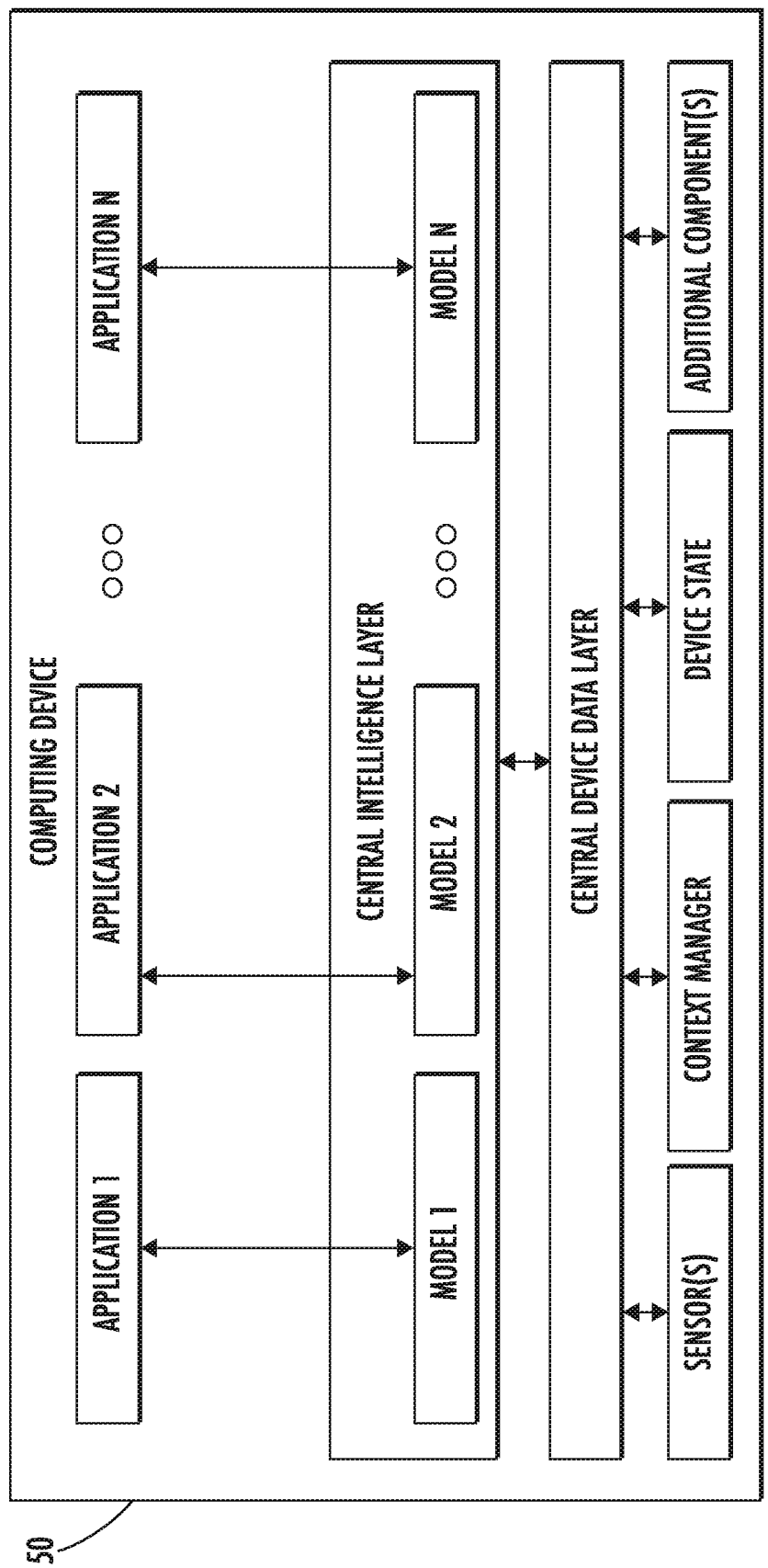
FIG. 1C depicts a block diagram of an example user computing device that performs message embedding and/or extraction according to example embodiments of the present disclosure.

FIG. 1C depicts a block diagram of an example computing device 50 that performs message embedding and/or extraction according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a machine-learned message embedding model, a machine-learned message extraction model, etc.) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
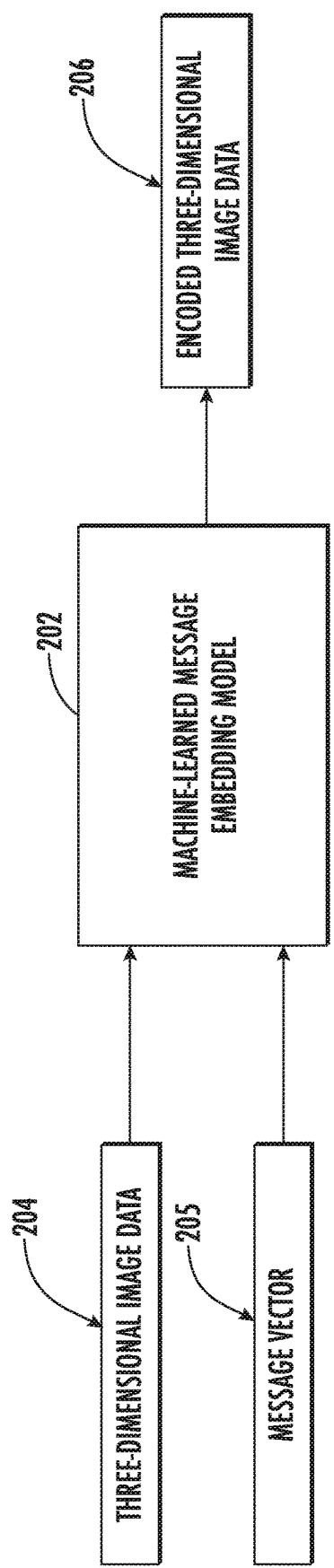
FIG. 2 depicts a block diagram of an example machine-learned message embedding model according to example embodiments of the present disclosure.

FIG. 2 depicts a block diagram of an example machine-learned message embedding model 202 according to example embodiments of the present disclosure. In some implementations, the machine-learned message embedding model 202 is trained to receive a set of input data 204 descriptive of a three-dimensional image and a message vector 205 and, as a result of receipt of the input data 204, provide output data 206 descriptive of an encoded three-dimensional image that includes an embedded message based on the message vector 205. Thus, in some implementations, the machine-learned message embedding model 202 can be operable to receive the three-dimensional image data 204 and the message vector 205 and generate encoded three-dimensional image data 206 based on the three-dimensional image data 204 and the message vector 205. The encoded three-dimensional image data 206 can include an embedded message that is based on the message vector 205.

The embedded message can be embedded in the encoded three-dimensional image data 206 through modification of one or more aspects of the three-dimensional image data 204. As an example, if the three-dimensional image data 204 is or otherwise includes a 3D mesh, the embedded message can be embedded by the machine-learned message embedding model 202 by modifying aspect(s) of vertice(s) of the 3D mesh (e.g., a vertex position, a vertex color, etc.). As another example, if the three-dimensional image data 204 is or otherwise includes one or more 3D volumes, the embedded message can be embedded by the machine-learned message embedding model 202 by modifying aspect(s) of the 3D volume(s) (e.g., volume value, a voxel size, a voxel position, etc.). As yet another example, if the three-dimensional image data 204 is or otherwise includes a material associated with a 3D representation, the embedded message can be embedded by the machine-learned message embedding model 202 by modifying aspect(s) of material(s) of the 3D representation (e.g. BSSRDF(s), BSDF(s), BRDF(s), texture color values, height maps, transparency maps, texture color(s), etc.). As yet another example, if the three-dimensional image data 204 is or otherwise includes a point cloud, the embedded message can be embedded by the machine-learned message embedding model 202 by modifying aspect(s) of the point cloud (e.g., point position(s), point value(s), point label(s), etc.).

The embedded message based on the message vector 205 can be any type or quantity of information. As an example, the embedded message may include a decryption key. The decryption key can correspond to an encrypted aspect of the three-dimensional image data 204 and/or any other encrypted information. As another example, the embedded message may include private information. For another example, the embedded message in the point cloud of the previous example may further be encrypted (e.g., to protect patient privacy, etc.), and the hidden message may include a decryption key to decrypt the remainder of the embedded message and/or the 3D data itself. Example 3D data can include 3D models (e.g., mesh models), medical imaging data (e.g., Mill data), LIDAR point clouds, RADAR data, and/or other forms of 3D data.

Figure 3:
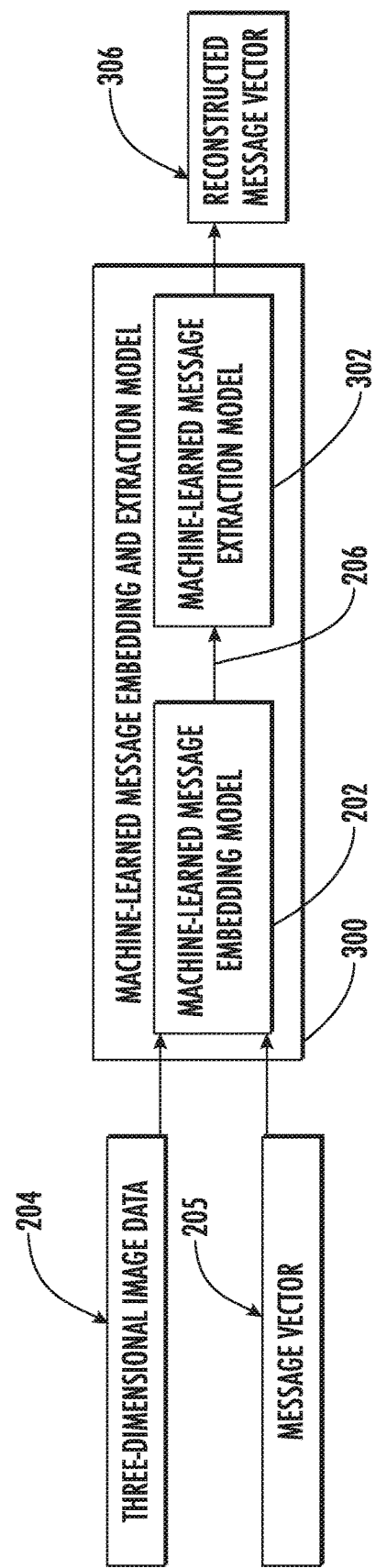
FIG. 3 depicts a block diagram of example machine-learned message embedding and extraction models according to example embodiments of the present disclosure.

FIG. 3 depicts a block diagram of an example machine-learned message embedding and extraction model 300 according to example embodiments of the present disclosure. The machine-learned message embedding and extraction model 300 is similar to machine-learned message embedding model 202 of FIG. 2 except that machine-learned message embedding and extraction model 300 further includes machine-learned message extraction model 302. More particularly, the three-dimensional image data 204 and the message vector can be received by the machine-learned message embedding model 202. The machine-learned message embedding model 202 can output the encoded three-dimensional image data 206 which can be received by the machine-learned message extraction model 302. The machine-learned message extraction model 302 can generate a reconstructed message vector 306 by extracting the embedded message from the encoded three-dimensional image data 206.

More particularly, the machine-learned message extraction model 302 can extract the embedded message from the encoded three-dimensional image data 206 to obtain a reconstructed message vector 306. The machine-learned message extraction model 302 can be or can otherwise include one or more neural networks (e.g., deep neural networks) or the like. Neural networks (e.g., deep neural networks) can be feed-forward neural networks, convolutional neural networks, and/or various other types of neural networks. In some implementations, the machine-learned message extraction model 302 and the machine-learned message embedding model 202 can be or otherwise be components of an autoencoder architecture (e.g., autoencoder(s), variational autoencoder(s), etc.). As an example, the machine-learned message embedding model 202 and/or the machine-learned message extraction model 302 can be a conditional variational autoencoder. As another example, a combination of both the machine-learned message embedding model 202 and the machine-learned message extraction model 302 can be a conditional variational autoencoder.

The reconstructed message vector 306 can be extracted from the encoded three-dimensional image data 206 using the machine-learned message extraction model 302. More particularly, the machine-learned message extraction model 302 can receive the encoded three-dimensional image data 206 and can extract the embedded message from the encoded three-dimensional image data 206 to obtain a reconstructed message vector 306. In some implementations, the reconstructed message vector 306 can be a lossless reconstruction of the message vector 205 (e.g., an identical or substantially similar instance of the message vector 205). Alternatively, in some implementations, the reconstructed message vector 306 can be a lossy reconstruction of the message vector 205. The data loss associated with the reconstruction of the reconstructed message vector 306 can vary depending on a number of factors (e.g., the type of the three-dimensional image data, the size of the message, the type of the message, etc.).

Figure 4A:
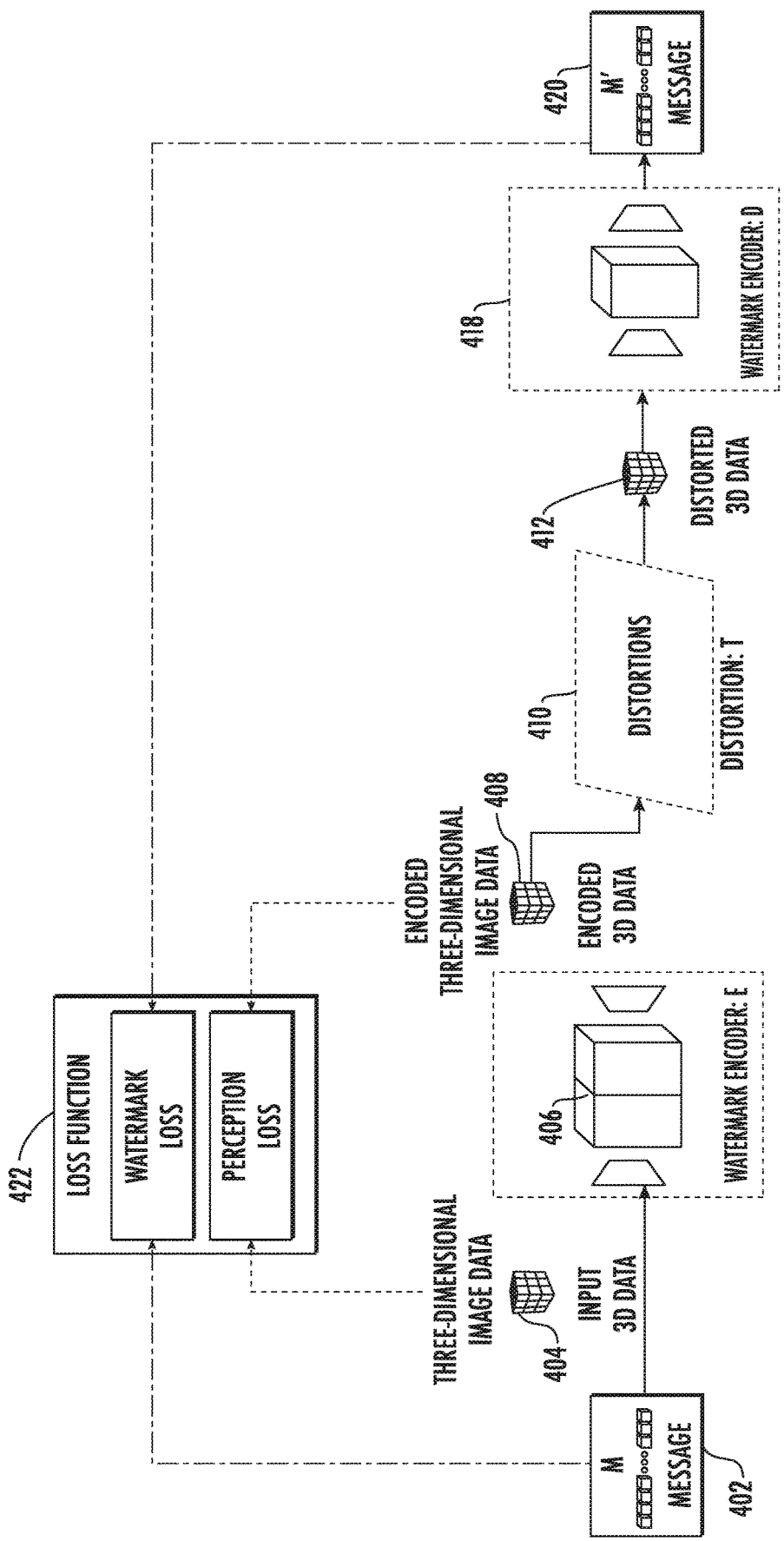
FIG. 4A is a data flow diagram that depicts an example training method for a viewpoint-independent machine-learned message embedding model and a viewpoint-independent machine-learned message extraction model according to example embodiments of the present disclosure.

FIG. 4A is a data flow diagram that depicts an example training method for a viewpoint-independent machine-learned message embedding model and a viewpoint-independent machine-learned message extraction model according to example embodiments of the present disclosure. More particularly, machine-learned message embedding model 406 can receive the three-dimensional image data 404 and the message vector 402. Based on the three-dimensional image data 404 and the message vector 402, the machine-learned message embedding model can output encoded three-dimensional image data 408.

In some implementations, distortion effect(s) 410 can be applied to the encoded three-dimensional image data 408 to obtain encoded three-dimensional image data 412 with distortion(s). More particularly, the one or more distortion effects 410 can be applied to the encoded three-dimensional image data 408 during the training of the model(s) (e.g., the machine-learned message embedding model 406 and the machine-learned message extraction model 418, etc.) to make the model(s) 406 and 418 more robust to distortions commonly applied to encoded three-dimensional image data 408 as it is manipulated by user(s) and/or transmitted between computing device(s). As an example, a distortion effect 410 can be applied to the encoded three-dimensional image data 408 that mimics image noise occurring from transmission and/or encoding data loss for the encoding of encoded three-dimensional image data 408. As another example, a distortion effect 410 can be applied that mimics image rotation, simplification, refinement, or cropping that could be applied by a user to the encoded three-dimensional image data 408 in a typical image data use-case scenario.

It should be noted that, in some implementations, by applying the distortion effect(s) 410 to the encoded three-dimensional image data 408, the model(s) 406 and 418 can be trained to embed the message 402 in the encoded three-dimensional image data 408 such that the encoded three-dimensional image data 408 is resistant to distortion effects. More particularly, the model(s) 406 and 418 can be trained to embed and extract the message 402 such that the message 402 can be retrieved (e.g., extracted by the machine-learned message extraction model 418) regardless of whether the encoded three-dimensional image data 408 has been severely cropped, simplified, refined, rotated, or distorted in any other manner. As an example, a distortion 410 can be applied that crops a significant portion of the encoded three-dimensional image data 408. In such fashion, over training iterations, the machine-learned message embedding model 406 can be trained to embed the message 402 in a manner that is resistant to cropping (e.g., embedding multiple instances of the message 402 in multiple locations of the encoded three-dimensional image data 408, etc.).

The machine-learned message extraction model 418 can receive the encoded three-dimensional message data 408 (or the distorted encoded three-dimensional message data 412) and, based on the image data, extract the reconstructed message vector 420. More particularly, The reconstructed message vector 420 can be extracted from the encoded three-dimensional image data 408 using the machine-learned message extraction model 418. In some implementations, the reconstructed message vector 420 can be a lossless reconstruction of the message vector 402 (e.g., an identical or substantially similar instance of the message vector 402). Alternatively, in some implementations, the reconstructed message vector 420 can be a lossy reconstruction of the message vector 402. The data loss associated with the reconstruction of the message vector 402 can vary depending on a number of factors (e.g., the type of the three-dimensional image data 408, the size of the message 402, the type of the message 402, etc.).

In some implementations, the machine-learned message extraction model 418 can also output the encoded three-dimensional image data 408. As an example, the output of the machine-learned message extraction model 418 can be the reconstructed message vector 420 and the encoded three-dimensional image data 408 (e.g., the three-dimensional image data including the embedded message). Alternatively, in some implementations, the machine-learned message extraction model 418 can decode the encoded three-dimensional image data 408 to output the three-dimensional image data 404 (e.g., remove the modifications to aspects of the image data 404 used to embed the message vector 402).

The loss function 422 can be evaluated to evaluate a difference between the reconstructed message vector 420 and the message vector 402. More particularly, the loss function 422 can evaluate a reconstruction error (e.g., a degree of encoding/decoding loss) associated with the embedding and extraction of the message 402/420 from the three-dimensional image data 402/408. Additionally, or alternatively, in some implementations, the loss function 422 can further evaluate a difference between the three-dimensional image data 404 and the encoded three-dimensional image data 408. More particularly, the loss function 422 can evaluate the perceptual difference resulting from the modification of aspects of the three-dimensional image data 404 to embed the message vector 402 in the encoded three-dimensional image data 408.

Values for one or more parameters of at least the machine-learned message embedding model 408 can be modified based on the loss function 422. Additionally, in some implementations, values for one or more parameters of the machine-learned message extraction model 418 can also be modified. As an example, the loss function 422 can be backpropagated through the machine-learned message embedding model 406 and the machine-learned message extraction model 418 to determine values associated with one or more parameters of the model(s) (e.g., 406 and 418) to be updated. The one or more parameters can be updated to reduce the difference evaluated by the loss function 422 (e.g., using an optimization procedure, such as a gradient descent algorithm). Thus, in such fashion, evaluation of the loss function 422 can, in some implementations, minimize a difference (e.g., a loss of data) from embedding and extracting the message from the three-dimensional image data 404 while also minimizing a difference (e.g., a perceptual difference) resulting from embedding the message in the three-dimensional image data 404, therefore providing a highly accurate but imperceptible or near-imperceptible message embedding in the encoded three-dimensional image data 408.

Figure 4B:
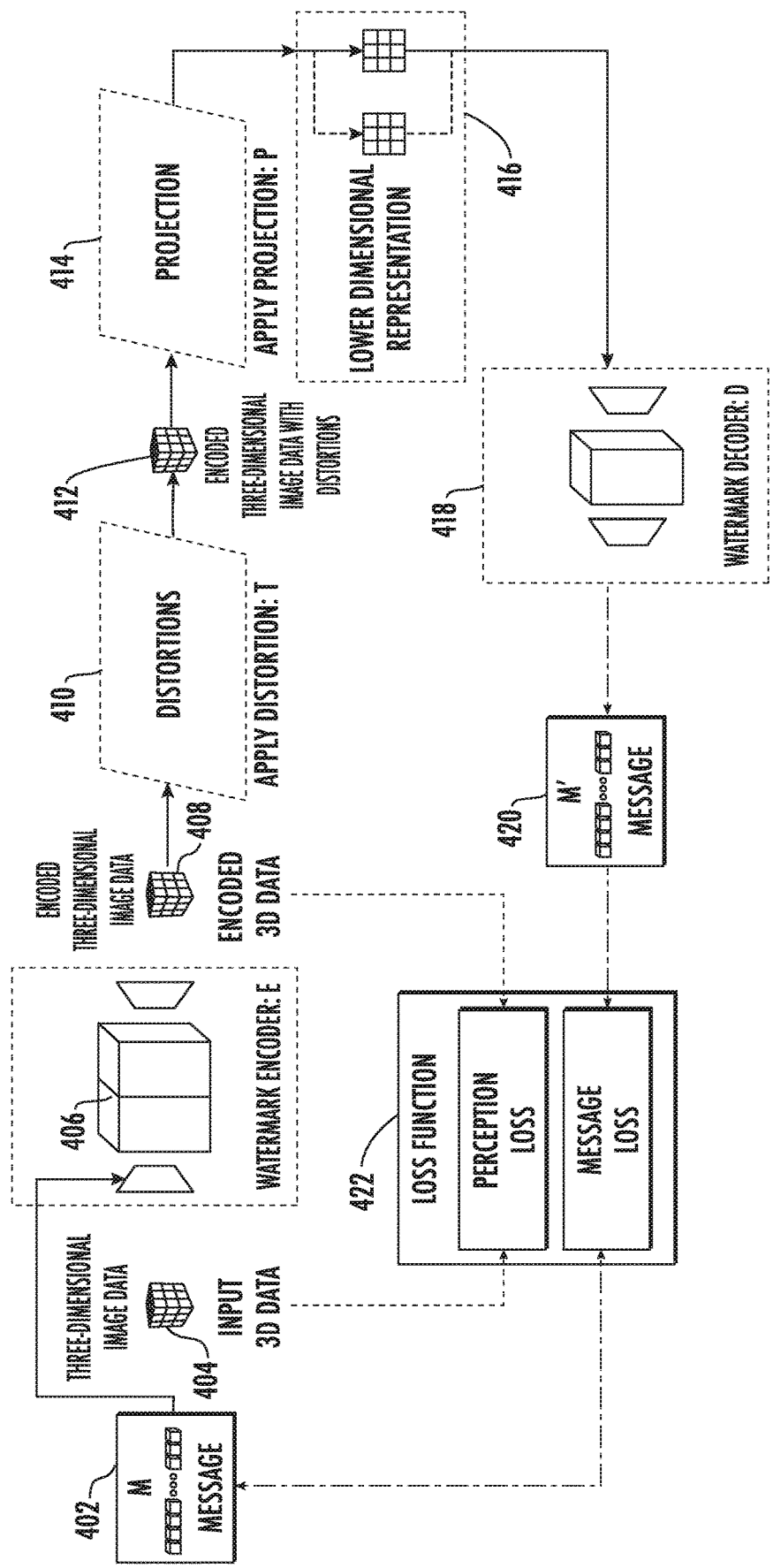
FIG. 4B is a data flow diagram that depicts an example training method for a viewpoint-dependent machine-learned message embedding model and a viewpoint-dependent machine-learned message extraction model according to example embodiments of the present disclosure.

FIG. 4B is a data flow diagram that depicts an example training method for a viewpoint-dependent machine-learned message embedding model and a viewpoint-dependent machine-learned message extraction model according to example embodiments of the present disclosure. More particularly, machine-learned message embedding model 406 can receive the three-dimensional image data 404 and the message vector 402. Based on the three-dimensional image data 404 and the message vector 402, the machine-learned message embedding model can output encoded three-dimensional image data 408. In some implementations, distortion effect(s) 410 can be applied to the encoded three-dimensional image data 408 to obtain distorted encoded three-dimensional image data 412 as previously described in FIG. 4A.

In some implementations, the encoded three-dimensional image data 408 (or distorted encoded three-dimensional image data 412) can be projected (e.g., via projection 414) to a lower-dimensional representation 416 of the encoded three-dimensional image data 408. The lower-dimensional representation 416 of the encoded three-dimensional image data 408 can correspond to a viewpoint (e.g., a camera position, viewpoint, etc.). As an example, if the encoded three-dimensional image data 408 is or otherwise includes a point cloud, the points of the point cloud can be projected (e.g., via projection 414) to a lower-dimensional space corresponding to a lower-dimensional viewpoint (e.g., a 2D projection, 2.5D projection with depth data, etc.). As another example, if the encoded three-dimensional image data 408 can be rendered or rasterized to a lower dimension, (e.g., a 3D mesh, a 3D volume, etc.), the 3D mesh can be rendered or rasterized (e.g., via projection 414) using a rendering scheme or rasterization scheme to a lower-dimensional space (e.g., a 2D frame of a video game for display on a display device, etc.) to generate the lower-dimensional representation 416.

In some implementations, the rendering scheme or rasterization scheme used in the projection 414 of the encoded three-dimensional image data 408 can include one or more camera parameters. The camera parameter(s) can determine what is included in the lower-dimensional representation 416 of the encoded three-dimensional image data 408. As an example, one or more implicit and/or one or more explicit camera parameters can be included to determine various aspects of the camera associated with rendering or rasterizing the encoded three-dimensional image data 408. As another example, camera location coordinates can be included that describe a location of the camera in a three-dimensional space. For example, the encoded three-dimensional image data 408 can include a 3D polygonal mesh representation of a vehicle. The camera location coordinates can describe a location of the camera such that the camera is located in front of the car. The rendering scheme can render the encoded three-dimensional image data 408 according to the camera parameter(s) such that the 2D representation of the encoded three-dimensional image data 408 (e.g., lower-dimensional representation 416) depicts the front of the car. Further, if the camera location coordinates describe a location of the camera behind the vehicle, the 2D representation (e.g., lower-dimensional representation 416) can depict the rear of the car. Similarly, other camera parameter(s) (e.g., camera aspect ratio, camera angle, camera field of view, etc.) can be included to further specify what is captured in the lower-dimensional representation of the encoded three-dimensional image data 408.

In some implementations, the projection 414 of encoded three-dimensional image data 408 to the lower dimensional representation 416 can utilize a differentiable rendering or rasterization scheme (e.g., via projection 414) to project the encoded three-dimensional image data 408 to the lower-dimensional representation 416. In such fashion, the differentiable rendering or rasterization scheme can allow for utilization of backpropagation and/or gradient descent algorithm(s) (e.g., stochastic gradient descent, etc.) to adjust value(s) for parameter(s) of the model(s).

In some implementations, the embedded message (e.g., based on message vector 402) can be embedded in the encoded three-dimensional image data 408 such that the embedded message can be extracted from any lower dimensional representation 416 of the encoded three-dimensional image data 416. The specific viewpoint-dependent projection of the embedded message will be discussed in greater detail with regards to FIG. 5.

The machine-learned message extraction model 418 can receive the encoded three-dimensional message data 408 (or the distorted encoded three-dimensional message data 412 or the lower dimensional representation 416) and, based on the image data, extract the reconstructed message vector 420. More particularly, The reconstructed message vector 420 can be extracted from the encoded three-dimensional image data 408 using the machine-learned message extraction model 418. In some implementations, the reconstructed message vector 420 can be a lossless reconstruction of the message vector 402 (e.g., an identical or substantially similar instance of the message vector 402). Alternatively, in some implementations, the reconstructed message vector 420 can be a lossy reconstruction of the message vector 402. The data loss associated with the reconstruction of the message vector 402 can vary depending on a number of factors (e.g., the type of the three-dimensional image data 408, the size of the message 402, the type of the message 402, etc.).

In some implementations, the reconstructed message vector 420 can be extracted from the lower-dimensional representation 416 projected (e.g., via projection 414) from the encoded three-dimensional image data 408. Extraction from the lower-dimensional representation 416 of the encoded three-dimensional image data 408 will be discussed in greater detail with regards to FIG. 5.

In some implementations, the machine-learned message extraction model 418 can also output the encoded three-dimensional image data 408. As an example, the output of the machine-learned message extraction model 418 can be the reconstructed message vector 420 and the encoded three-dimensional image data 408 (e.g., the three-dimensional image data including the embedded message). Alternatively, in some implementations, the machine-learned message extraction model 418 can decode the encoded three-dimensional image data 408 to output the three-dimensional image data 404 (e.g., remove the modifications to aspects of the image data 404 used to embed the message vector 402).

The loss function 422 can be evaluated to evaluate a difference between the reconstructed message vector 420 and the message vector 402. More particularly, the loss function 422 can evaluate a reconstruction error (e.g., a degree of encoding/decoding loss) associated with the embedding and extraction of the message 402/420 from the three-dimensional image data 402/408. Additionally, or alternatively, in some implementations, the loss function 422 can further evaluate a difference between the three-dimensional image data 404 and the encoded three-dimensional image data 408. More particularly, the loss function 422 can evaluate the perceptual difference resulting from the modification of aspects of the three-dimensional image data 404 to embed the message vector 402 in the encoded three-dimensional image data 408.

Values for one or more parameters of at least the machine-learned message embedding model 408 can be modified based on the loss function 422. Additionally, in some implementations, values for one or more parameters of the machine-learned message extraction model 418 can also be modified. As an example, the loss function 422 can be backpropagated through the machine-learned message embedding model 406 and the machine-learned message extraction model 418 to determine values associated with one or more parameters of the model(s) (e.g., 406 and 418) to be updated. The one or more parameters can be updated to reduce the difference evaluated by the loss function 422 (e.g., using an optimization procedure, such as a gradient descent algorithm). Thus, in such fashion, evaluation of the loss function 422 can, in some implementations, minimize a difference (e.g., a loss of data) from embedding and extracting the message from the three-dimensional image data 404 while also minimizing a difference (e.g., a perceptual difference) resulting from embedding the message in the three-dimensional image data 404, therefore providing a highly accurate but imperceptible or near-imperceptible message embedding in the encoded three-dimensional image data 408.

Figure 5:
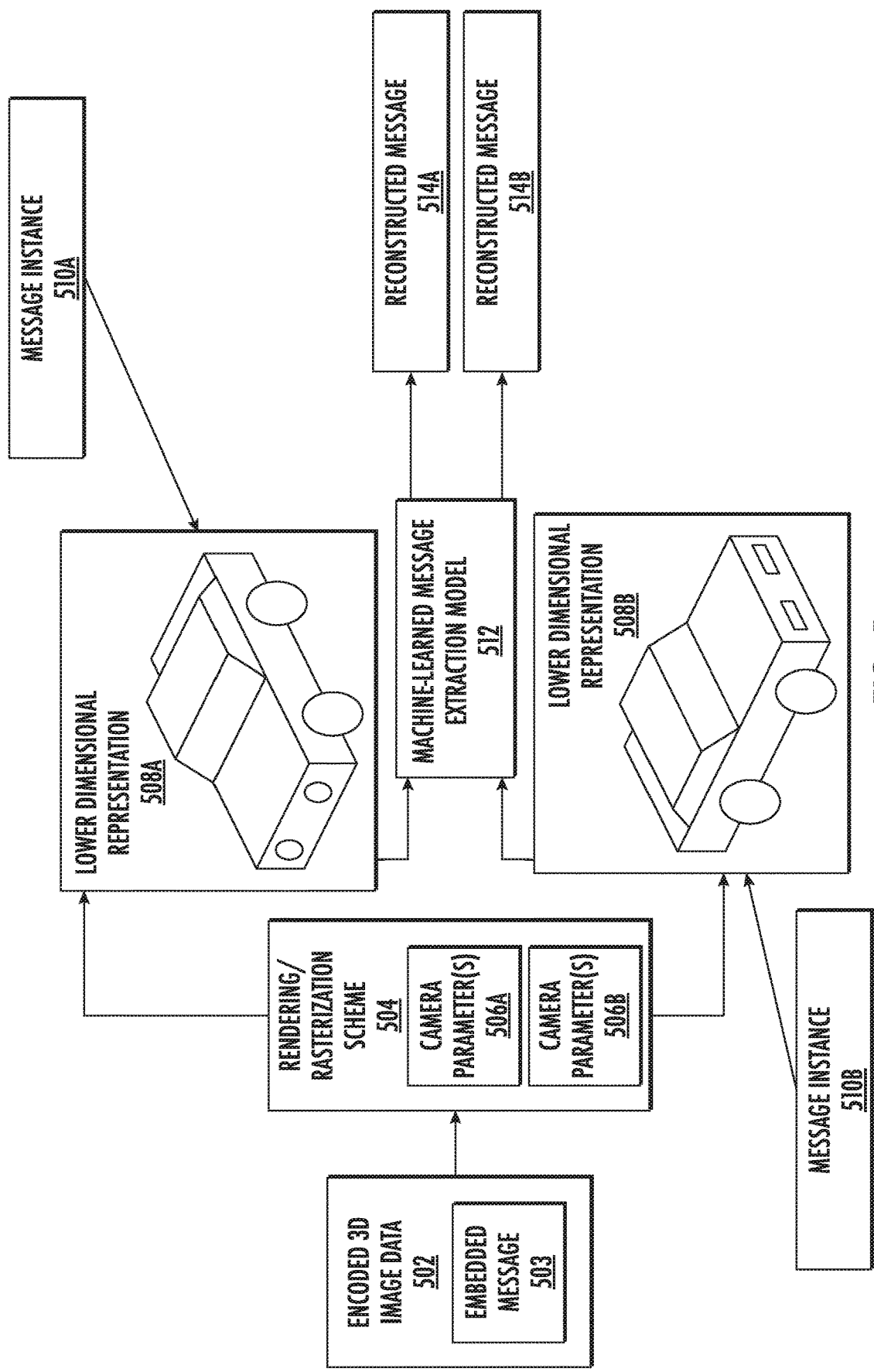
FIG. 5 depicts an example method for viewpoint-dependent message embedding in three-dimensional image data according to example embodiments of the present disclosure.

FIG. 5 depicts an example viewpoint-dependent message embedding in three-dimensional image data according to example embodiments of the present disclosure. More particularly, encoded 3D image data 502 can include an embedded message 503. The embedded message 503 can be embedded by a machine-learned message embedding model (e.g., the machine-learned message embedding model 202 of FIG. 2, etc.). A rendering/rasterization scheme 504 can be applied to the encoded 3D image data 502. The rendering/rasterization scheme 504 can include one or more camera parameters. As depicted, the rendering/rasterization scheme is depicted with two sets of camera parameters 506A and 506B. However, this is merely to demonstrate the different viewpoints (e.g., 508A and 508B) generated from utilizing differing camera parameters (e.g., 506A and 506B).

The rendering/rasterization scheme 504 can be applied to the encoded 3D image data 502 according to the camera parameters 506A to generate lower dimensional representation 508A. As depicted, the lower dimensional representation 508A depicts a lower dimensional rendering of the front-right side of a vehicle based on the camera parameters 506A. As an example, the camera parameters 506A can specify a camera location in three-dimensional space that, when utilized, renders the car from the presently depicted perspective (e.g., the front-right side of the car). Moreover, the lower dimensional representation 508A depicts an embedding of an instance of the embedded message 503 somewhere on the right side of the vehicle (e.g., message instance 510A).

Similarly, the rendering/rasterization scheme 504 can be applied to the encoded 3D image data 502 according to the camera parameters 506B to generate lower dimensional representation 508B. As depicted, the lower dimensional representation 508B depicts a lower dimensional rendering of the front-left side of a vehicle based on the camera parameters 506B. As an example, the camera parameters 506B can specify a camera location in three-dimensional space that, when utilized, renders the car from the presently depicted perspective. Moreover, the lower dimensional representation 508B depicts an embedding of an instance of the embedded message 503 somewhere on the left side of the vehicle (e.g., message instance 510B). It should be noted that the opposing perspectives (e.g., 508A and 508B) are depicted merely to demonstrate that instances of the message (e.g., embedded message 503) can be embedded on multiple locations of the encoded three-dimensional image data (e.g., 508A and 508B). As such, the message instances 508A/508B can be located on the lower dimensional representation in the same locations regardless of the camera parameters used (e.g., 506A/506B). For example, although not visible, it can be assumed that the lower dimensional representation 508A can also include the same message instance 510B in the same location as depicted in lower dimensional representation 508B. In such fashion, the embedded message 503 can be "viewed" (e.g., and extracted by a machine-learned extraction model 512) in a lower dimensional representation (e.g., 508A and 508B) regardless of the camera parameters used to render and/or rasterize the encoded 3D image data 502.

The machine-learned extraction model 512 can receive the message instances 510A/510B and generate two reconstructed messages 514A and 514B. The reconstructed messages can be identical or substantially similar to each other. Further, the messages 514A/514B can be identical or substantially similar to the message vector the embedded message 503 is based on. More particularly, the reconstructed messages 514A and 514B can be instances of the same message.

Thus, instances of the message (e.g., embedded message 503) can, when rendering or rasterizing the encoded three-dimensional image data 502, be broadly applied to multiple aspects of the encoded three-dimensional image data such that the message is extractable by the machine-learned message extraction model 512 regardless of the camera parameter(s) utilized. For example, if camera parameter(s) 506A located the camera directly in front of a tire of the car in lower dimensional representation 508A (e.g., only the tire of the car was visible), the embedded message 503 can have been embedded in the encoded 3D image data 502 such that the machine-learned message extraction model 512 can still extract the embedded message 503 from just the lower-dimensional representation of the tire. As such, the encoded 3D image data 502 can be projected (e.g., via rendering and/or rasterization scheme 504) to a lower dimensional representation (e.g., 508A and 508B) such that the embedded message 503 is extractable by the machine-learned message extraction model 512 regardless of the camera parameters utilized (e.g., 506A/506B).

Example Methods

Figure 6:
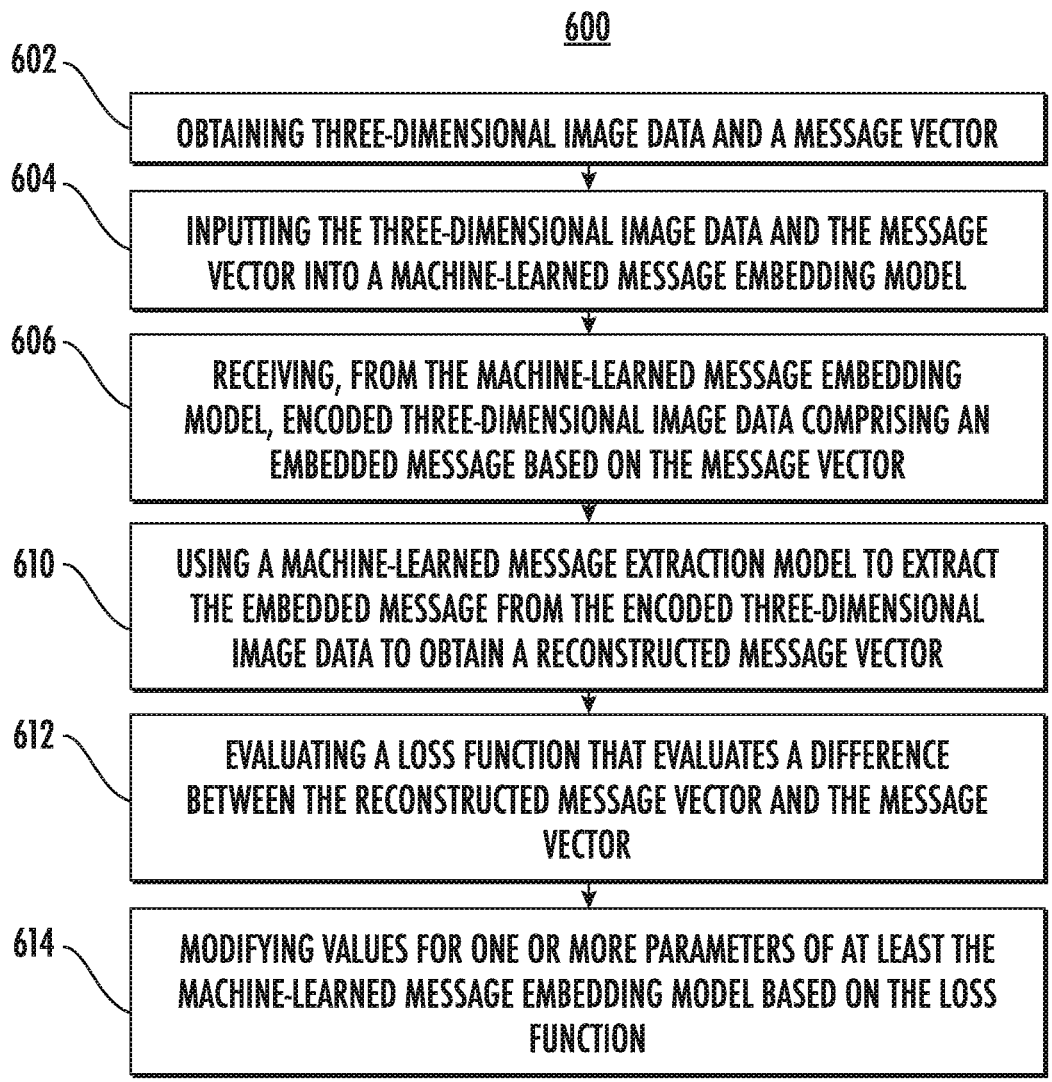
FIG. 6 depicts a flow chart diagram of an example method to perform end-to-end training of machine-learned message embedding and extraction models according to example embodiments of the present disclosure.

FIG. 6 depicts a flow chart diagram of an example method to perform end-to-end training of machine-learned message embedding and extraction models according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can perform a method. The method 600 can include obtaining three-dimensional image data and a message vector. More particularly, the message vector can be a portion of data that includes a message to be embedded in the three-dimensional image data. It should be noted that the message vector is not required to be a vector or vector-like data structure. Instead, a message vector can be any sort of data that includes a message. As an example, the message vector can represent the message as a vector of bits. As another example, the message vector can be a latent space vector (e.g., from an encoder model, etc.). As another example, the message can be a two-dimensional or three-dimensional array. As such, the machine-learned message embedding model can utilize any form and/or size of message vector for embedding in the three-dimensional image data.

At 604, the computing system can perform a method. The method 600 can include inputting the three-dimensional image data and the message vector into the machine-learned message embedding model. The machine-learned message embedding model can receive the three-dimensional image data and the message vector and generate encoded three-dimensional image data based on the three-dimensional image data and the message vector. The encoded three-dimensional image data can include an embedded message that is based on the message vector. The machine-learned message embedding model can be or can otherwise include one or more neural networks (e.g., deep neural networks) or the like. Neural networks (e.g., deep neural networks) can be feed-forward neural networks, convolutional neural networks, and/or various other types of neural networks. In some implementations, the machine-learned message embedding model can be or otherwise include a conditional variational autoencoder.

The embedded message can be embedded through modification of one or more aspects of the three-dimensional image data. As an example, if the three-dimensional image data is or otherwise includes a 3D mesh, the embedded message can be embedded by the machine-learned message embedding model by modifying aspect(s) of vertice(s) of the 3D mesh (e.g., a vertex position, a vertex color, etc.). As another example, if the three-dimensional image data is or otherwise includes one or more 3D volumes, the embedded message can be embedded by the machine-learned message embedding model by modifying aspect(s) of the 3D volume(s) (e.g., volume value, a voxel size, a voxel position, etc.). As yet another example, if the three-dimensional image data is or otherwise includes a material associated with a 3D representation, the embedded message can be embedded by the machine-learned message embedding model by modifying aspect(s) of material(s) of the 3D representation (e.g. BSSRDF(s), BSDF(s), BRDF(s), texture color values, height maps, transparency maps, texture color(s), etc.). As yet another example, if the three-dimensional image data is or otherwise includes a point cloud, the embedded message can be embedded by the machine-learned message embedding model by modifying aspect(s) of the point cloud (e.g., point position(s), point value(s), point label(s), etc.).

The embedded message based on the message vector can be any type or quantity of information. As an example, the embedded message may include a decryption key. The decryption key can correspond to an encrypted aspect of the three-dimensional image data and/or any other encrypted information. As another example, the embedded message may include private information. For another example, the embedded message in the point cloud of the previous example may further be encrypted (e.g., to protect patient privacy, etc.), and the hidden message may include a decryption key to decrypt the remainder of the embedded message and/or the 3D data itself. Example 3D data can include 3D models (e.g., mesh models), medical imaging data (e.g., Mill data), LIDAR point clouds, RADAR data, and/or other forms of 3D data.

As another example, the embedded message may include authentication information. The authentication information can be configured to authenticate a source for the three-dimensional image data. For example, the authentication information may be or otherwise include a cryptographic hash, code, and/or key associated with the creator and/our source of the three-dimensional image data. For another example, the authentication information may identify the three-dimensional image data as authentic (e.g., not pirated, stolen, reproduced, etc.). As yet another example, the embedded message may include location information. The location information may describe a transmitting location for the three-dimensional image data, a receiving location for the three-dimensional image data, or both. For example, the location data may include an IP address associated with a sender of the three-dimensional image data. For another example, the location information may include geolocational coordinates corresponding to the sender of the three-dimensional image data.

In some implementations, the encoded three-dimensional image data can be projected to a lower-dimensional representation of the encoded three-dimensional image data. The lower-dimensional projection of the encoded three-dimensional image data can correspond to a viewpoint (e.g., a camera position, viewpoint, etc.). As an example, if the encoded three-dimensional image data is or otherwise includes a point cloud, the points of the point cloud can be projected to a lower-dimensional space corresponding to a lower-dimensional viewpoint (e.g., a 2D projection, 2.5D projection with depth data, etc.). As another example, if the encoded three-dimensional image data can be rendered or rasterized to a lower dimension, (e.g., a 3D mesh, a 3D volume, etc.), the 3D mesh can be rendered or rasterized using a rendering scheme or rasterization scheme to a lower-dimensional space (e.g., a 2D frame of a video game for display on a display device, etc.).

In some implementations, the rendering scheme or rasterization scheme used to project the encoded three-dimensional image data can include one or more camera parameters. The camera parameter(s) can determine what is included in the lower-dimensional representation of the encoded three-dimensional image data. As an example, one or more implicit and/or one or more explicit camera parameters can be included to determine various aspects of the camera associated with rendering or rasterizing the encoded three-dimensional image data. As another example, camera location coordinates can be included that describe a location of the camera in a three-dimensional space. For example, the encoded three-dimensional image data can include a 3D polygonal mesh representation of a vehicle. The camera location coordinates can describe a location of the camera such that the camera is located in front of the car. The rendering scheme can render the encoded three-dimensional image data according to the camera parameter(s) such that a 2D representation of the encoded three-dimensional image data depicts the front of the car. Further, if the camera location coordinates describe a location of the camera behind the vehicle, the 2D representation can depict the rear of the car. Similarly, other camera parameter(s) (e.g., camera aspect ratio, camera angle, camera field of view, etc.) can be included to further specify what is captured in the lower-dimensional representation of the encoded three-dimensional image data.

In some implementations, the embedded message can be embedded in the encoded three-dimensional image data such that the embedded message can be extracted from any lower dimensional representation of the image data. As an example, to further use the previous example of a lower-dimensional representation of a car from a front side and a rear side, the embedded message could be extracted from the lower dimensional representation of the front side and/or the lower dimensional representation of the rear side. In such fashion, any projection, rendering, or rasterization of the encoded three-dimensional image data, based on any camera parameter(s), can include the embedded message for extraction (e.g., by a machine-learned message extraction model, etc.).

At 606, the computing system can perform a method. The method 600 can include receiving the encoded three-dimensional image data that includes the embedded message from the machine-learned message embedding model. In some implementations, a first computing device of the computing system can receive the encoded three-dimensional image data from the machine-learned message embedding model and transmit the encoded three-dimensional image data to a second computing device of the computing system (e.g., via a network, etc.). Alternatively, in some implementations, the computing system can transmit the encoded three-dimensional image data to a second computing system distinct from the first computing system (e.g., via a network, etc.). In such fashion, the computing system can generate the encoded three-dimensional image data at a first location (e.g., a first computing device of the computing system, a first computing system, etc.) and transmit the encoded three-dimensional image data for decoding at a second location (e.g., a second computing device of the computing system, a second computing system, etc.), thereby facilitating transmission of the hidden (e.g., embedded) message to a receiving party.

At 608, the computing system can perform a method. The method 600 can include using a machine-learned message extraction model to extract the embedded message from the encoded three-dimensional image data to obtain a reconstructed message vector. The machine-learned message extraction model can be or can otherwise include one or more neural networks (e.g., deep neural networks) or the like. Neural networks (e.g., deep neural networks) can be feed-forward neural networks, convolutional neural networks, and/or various other types of neural networks. In some implementations, the machine-learned message extraction model and the machine-learned message embedding model can be or otherwise be components of an autoencoder architecture (e.g., autoencoder(s), variational autoencoder(s), etc.). As an example, the machine-learned message embedding model and/or the machine-learned message extraction model can be a conditional variational autoencoder. As another example, a combination of both the machine-learned message embedding model and the machine-learned message extraction model can be a conditional variational autoencoder.

The reconstructed message vector can be extracted from the encoded three-dimensional image data using the machine-learned message extraction model. More particularly, the machine-learned message extraction model can receive the encoded three-dimensional image data and the extract the embedded message from the encoded three-dimensional image data to obtain a reconstructed message vector. In some implementations, the reconstructed message vector can be a lossless reconstruction of the message vector (e.g., an identical or substantially similar instance of the message vector). Alternatively, in some implementations, the reconstructed message vector can be a lossy reconstruction of the message vector. The data loss associated with the reconstruction of the message vector can vary depending on a number of factors (e.g., the type of the three-dimensional image data, the size of the message, the type of the message, etc.). In some implementations, the reconstructed message vector can be extracted from the lower-dimensional representation projected from the encoded three-dimensional image data.

In some implementations, the machine-learned message extraction model can also output the encoded three-dimensional image data. As an example, the output of the machine-learned message extraction model can be the reconstructed message vector and the encoded three-dimensional image data (e.g., the three-dimensional image data including the embedded message). Alternatively, in some implementations, the machine-learned message extraction model can decode the encoded three-dimensional image data to output the three-dimensional image data (e.g., remove the modifications to aspects of the image data used to embed the embedded message).

At 610, the computing system can perform a method. The method 600 can include evaluating a loss function that evaluates a difference between the reconstructed message vector and the message vector. More particularly, the loss function can evaluate a reconstruction error (e.g., a degree of encoding/decoding loss) associated with the embedding and extraction of the message from the three-dimensional image data. Additionally, or alternatively, in some implementations, the loss function can further evaluate a difference between the three-dimensional image data and the encoded three-dimensional image data. More particularly, the loss function can evaluate the perceptual difference resulting from the modification of aspects of the three-dimensional image data to embed the message.

At 612, the computing system can perform a method. The method 600 can include modifying values for one or more parameters of at least the machine-learned message embedding model based on the loss function. Additionally, in some implementations, the computing system can also modify values for one or more parameters of the machine-learned message extraction model. As an example, the loss function can be backpropagated through the machine-learned message embedding model and the message extraction model to determine values associated with one or more parameters of the models to be updated. The one or more parameters can be updated to reduce the difference evaluated by the loss function (e.g., using an optimization procedure, such as a gradient descent algorithm). Thus, in such fashion, evaluation of the loss function can, in some implementations, minimize a difference (e.g., a loss of data) from embedding and extracting the message from the three-dimensional image data while also minimizing a difference (e.g., a perceptual difference) resulting from embedding the message in the three-dimensional image data, therefore providing a highly accurate but imperceptible or near-imperceptible message embedding.

In some implementations, prior to using the machine-learned message extraction model to extract the embedded message, the computing system can distort the encoded three-dimensional image data with one or more distortion effects. More particularly, the computing system can apply one or more distortion effects to the encoded three-dimensional image data while training the model(s) to make the model(s) more robust to common distortion effects applied to three-dimensional image data during usage of the trained model(s). The distortion effect(s) can include image noise, image rotation, image simplification, image data refinement, image cropping, encoding loss (e.g., data loss associated with a lossy encoding scheme), or any other sort of distortion effect(s).

In some implementations, while training the model(s) (e.g., evaluating a loss function and modifying value(s) of parameter(s) of the model(s)), the computing system can utilize a differentiable rendering or rasterization scheme to project the encoded three-dimensional image data to a lower-dimensional representation. In such fashion, the differentiable rendering or rasterization scheme can allow for utilization of backpropagation and/or gradient descent algorithm(s) (e.g., stochastic gradient descent, etc.) to adjust value(s) for parameter(s) of the model(s).

It should be noted that any contemporary differentiable rendering scheme can be utilized during training to project the encoded three-dimensional image data to a lower dimensional representation. As an example, differentiable Monte Carlo ray tracing through edge sampling can be utilized as a differentiable rendering scheme (See Tzu-Mao Li et al., *Differentiable Monte Carlo Ray Tracing through Edge Sampling*, ACM Trans. Graph., (ACM), Vol. 37, No. 6, Article 222 (November 2018)). As another example, deep convolutional network(s) can be used as a differentiable rendering scheme (See Thu Nguyen-Phuoc, Chuan Li, Stephen Balaban, Yong-Liang Yang, *RenderNet: A deep convolutional* network for differentiable rendering from 3D shapes, 32<sup>nd</sup> Conference on Neural Information Processing Systems, (NeurIPS 2018), pp. 7891-7901 (November 2018)). As yet another example, soft rasterization can be utilized as a differentiable rasterization scheme (See Shichen Liu, Weikai Chen, Tianye Li, Hao Li, *Soft Rasterizer: Differentiable Rendering for Unsupervised Single-View Mesh Reconstruction*, arXiv preprint, (arXiv), arXiv:1901.05567 (2019)). As yet another example, neural radiance fields can be utilized as a differentiable rendering scheme (See Ben Mildenhall, Pratul P. Srinivasan, Matthew Tancik, Jonathan T. Barron, Ravi Ramamoorthi, Ren Ng, *NeRF: Representing Scenes as Neural Radiance Fields for View Synthesis*, arXiv preprint, (arXiv), arXiv:2003.08934 (2020)). In such fashion, any contemporary, state-of-the-art, or future differentiable rendering and/or rasterization scheme can be utilized to provide differentiable rendering and/or rasterization in accordance with the present embodiments.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
   one or more processors;
   a machine-learned message embedding model, the machine-learned message embedding model configured to:
     receive three-dimensional image data and a message vector; and
     generate, based on the three-dimensional image data and the message vector, encoded three-dimensional image data, the three-dimensional image data comprising an embedded message based on the message vector;
   a machine-learned message extraction model, the machine-learned message extraction model configured to:
     receive the encoded three-dimensional image data; and
     extract the embedded message from the encoded three-dimensional image data to obtain a reconstructed message vector; and
   a first set of instructions that, when executed by the one or more processors, cause the computing system to perform operations, the operations comprising:
     obtaining the three-dimensional image data and the message vector;
     inputting the three-dimensional image data and the message vector into the machine-learned message embedding model to obtain the encoded three-dimensional image data comprising the embedded message;
     using the machine-learned message extraction model to extract the embedded message from the encoded three-dimensional image data to obtain the reconstructed message vector;
     evaluating a loss function that evaluates a reconstruction error that is associated with a difference between the message vector and the reconstructed message vector that is based on embedding the message vector and extracting the reconstructed message vector from the three-dimensional image data, wherein the loss function further evaluates a perceptual difference between the three-dimensional image data and the encoded three-dimensional image data that corresponds to the embedding of the embedded message; and
     modifying values for one or more parameters of at least the machine-learned message embedding model based on the loss function.

2. The computing system of claim 1, further comprising a second set of instructions that, when executed by the one or more processors, cause the computing system to perform operations, the operations comprising:
   modifying values for one or more parameters of at least the machine-learned message extraction model based on the loss function.

3. The computing system of claim 1, further comprising, prior to using the machine-learned message extraction model to extract the embedded message from the encoded three-dimensional image data to obtain the reconstructed message vector, distorting the encoded three-dimensional image data with one or more distortion effects, the one or more distortion effects comprising at least one of:
   image noise;
   image rotation;
   image simplification;
   image data refinement;
   image cropping; or
   data loss associated with a lossy encoding scheme.

4. The computing system of claim 1, further comprising, prior to using the machine-learned message extraction model to extract the embedded message from the encoded three-dimensional image data to obtain the reconstructed message vector:
   projecting the encoded three-dimensional image data to a lower dimension to receive a lower-dimensional representation of the encoded three-dimensional image data;
   wherein using the machine-learned message extraction model to extract the embedded message from the encoded three-dimensional image data to obtain the reconstructed message vector comprises using the machine-learned message extraction model to extract the embedded message from the lower-dimensional representation of the encoded three-dimensional image data.

5. The computing system of claim 4, wherein projecting the encoded three-dimensional image data to the lower dimension to receive the lower-dimensional representation of the encoded three-dimensional image data comprises:
rendering, using a differentiable rendering scheme, the three-dimensional image data in the lower dimension to receive the lower-dimensional representation of the three-dimensional image data; or
rasterizing, using a differentiable rasterization scheme, the three-dimensional image data in the lower dimension to receive the lower-dimensional representation of the three-dimensional image data.

6. A computer-implemented method for watermark-based message embedding for three-dimensional images, the method comprising:
obtaining, by one or more computing devices, three-dimensional image data and a message vector;
inputting, by the one or more computing devices, the three-dimensional image data and the message vector into a machine-learned message embedding model;
receiving, by the one or more computing devices from the machine-learned message embedding model, encoded three-dimensional image data comprising an embedded message based on the message vector;
using, by the one or more computing devices, a machine-learned message extraction model to extract the embedded message from the encoded three-dimensional image data to obtain a reconstructed message vector;
evaluating, by the one or more computing devices, a loss function that evaluates a reconstruction error that is associated with a difference between the message vector and the reconstructed message vector that is based on embedding the message vector and extracting the reconstructed message vector from the three-dimensional image data, wherein the loss function further evaluates a perceptual difference between the three-dimensional image data and the encoded three-dimensional image data that corresponds to the embedding of the embedded message; and
modifying, by the one or more computing devices, values for one or more parameters of at least the machine-learned message embedding model based on the loss function.

7. The computer-implemented method of claim 6, wherein at least the machine-learned message embedding model comprises a conditional variational autoencoder.

8. The computer-implemented method of claim 6, wherein the embedded message comprises at least one of:
identification information; a decryption key;
authentication information configured to authenticate a source of the three-dimensional image data; or
location information describing at least one of a transmitting location or a receiving location of the three-dimensional image data.

9. The computer-implemented method of claim 6, wherein one or more of the machine-learned message embedding model or the machine-learned message extraction model are trained based on an objective function, wherein the objective function evaluates at least one of:
one or more differences between the three-dimensional image data and the encoded three-dimensional image data; or
one or more differences between the message vector and the reconstructed message vector.

10. The computer-implemented method of claim 6, wherein the message vector is a latent space vector.

11. The computer-implemented method of claim 6, further comprising, prior to using the machine-learned message extraction model to extract the embedded message from the encoded three-dimensional image data to obtain the reconstructed message vector:
projecting, by the one or more computing devices, the encoded three-dimensional image data to a lower dimension to receive a lower-dimensional representation of the encoded three-dimensional image data;
wherein using the machine-learned message extraction model to extract the embedded message from the encoded three-dimensional image data to obtain the reconstructed message vector comprises using, by the one or more computing devices, the machine-learned message extraction model to extract the embedded message from the lower-dimensional representation of the encoded three-dimensional image data.

12. The computer-implemented method of claim 11, wherein projecting, by the one or more computing devices, the encoded three-dimensional image data to the lower dimension to receive the lower-dimensional representation of the encoded three-dimensional image data comprises:
rendering, by the one or more computing devices using a rendering scheme, the three-dimensional image data in the lower dimension to receive the lower-dimensional representation of the three-dimensional image data; or
rasterizing, by the one or more computing devices using a rasterization scheme, the three-dimensional image data in the lower dimension to receive the lower-dimensional representation of the three-dimensional image data.

13. The computer-implemented method of claim 12, wherein the rendering scheme and the rasterization scheme comprise one or more camera parameters, the one or more camera parameters comprising at least one of:
one or more implicit camera parameters;
one or more explicit camera parameters;
camera location coordinates, the camera location coordinates describing a location of a camera in a three-dimensional space;
a camera aspect ratio;
a camera angle; or
a camera field of view.

14. The computer-implemented method of claim 12, wherein the machine-learned message extraction model is configured to extract the embedded message from any projected viewpoint of the encoded three-dimensional image data.

15. The computer-implemented method of claim 6, wherein the three-dimensional image data comprises at least one of:
a three-dimensional mesh;
one or more materials associated with the three-dimensional mesh;
a point cloud; or
a three-dimensional volumetric representation.

16. The computer-implemented method of claim 15, wherein:
the encoded three-dimensional image data comprises an encoded point cloud; and
the embedded message comprises object identification data associated with at least one point of a plurality of points of the encoded point cloud.

17. One or more tangible, non-transitory computer readable media storing computer-readable instructions that when executed by one or more processors cause the one or more processors to perform operations, the operations comprising:

obtaining three-dimensional image data and a message vector;

inputting the three-dimensional image data and the message vector into a machine-learned message embedding model;

receiving, from the machine-learned message embedding model, encoded three-dimensional image data comprising an embedded message based on the message vector;

using a machine-learned message extraction model to extract the embedded message from the encoded three-dimensional image data to obtain a reconstructed message vector;

evaluating a loss function that evaluates a reconstruction error that is associated with a difference between the message vector and the reconstructed message vector that is based on embedding the message vector and extracting the reconstructed message vector from the three-dimensional image data, wherein the loss function further evaluates a perceptual difference between the three-dimensional image data and the encoded three-dimensional image data that corresponds to the embedding of the embedded message; and modifying values for one or more parameters of at least the machine-learned message embedding model based on the loss function.

18. The one or more tangible, non-transitory computer readable media of claim 17, further comprising, prior to using the machine-learned message extraction model to extract the embedded message from the encoded three-dimensional image data to obtain the reconstructed message vector:

projecting the encoded three-dimensional image data to a lower dimension to receive a lower-dimensional representation of the encoded three-dimensional image data;

wherein using the machine-learned message extraction model to extract the embedded message from the encoded three-dimensional image data to obtain the reconstructed message vector comprises using the machine-learned message extraction model to extract the embedded message from the lower-dimensional representation of the encoded three-dimensional image data.

19. The one or more tangible, non-transitory computer readable media of claim 17, wherein at least the machine-learned message embedding model comprises a conditional variational autoencoder.

20. The one or more tangible, non-transitory computer readable media of claim 17, wherein the three-dimensional image data comprises at least one of:

a three-dimensional mesh;

one or more materials associated with the three-dimensional mesh;

a point cloud; or a three-dimensional volumetric representation.

* * * * *